United States Patent [19]

Schmid et al.

[11] Patent Number: 5,460,337
[45] Date of Patent: Oct. 24, 1995

[54] SEAT BELT RETRACTOR

[75] Inventors: Johannes Schmid, Schwäbisch Gmünd; Thomas Mödinger, Alfdorf, both of Germany

[73] Assignee: TRW Repa GmbH, Alfdorf, Germany

[21] Appl. No.: 251,487

[22] Filed: May 31, 1994

[30] Foreign Application Priority Data

Jun. 1, 1993 [DE] Germany .......... 43 18 161.9

[51] Int. Cl.$^6$ .......... B65H 75/48
[52] U.S. Cl. .......... 242/375
[58] Field of Search .......... 242/375, 375.1, 242/375.2; 280/807; 297/475; 267/156; 185/45

[56] References Cited

U.S. PATENT DOCUMENTS

| | | | |
|---|---|---|---|
| 696,160 | 3/1902 | Blodgett | 242/375.1 |
| 1,794,825 | 3/1931 | Benedict | 242/375 X |
| 2,094,182 | 9/1937 | Nash | 242/375.2 X |
| 2,596,648 | 5/1952 | Bugg | 242/375.1 |
| 4,340,190 | 7/1982 | Zavatkay . | |
| 4,340,191 | 7/1982 | Zavatkay . | |
| 4,534,520 | 8/1985 | Yanagihara . | |
| 4,776,574 | 10/1988 | Krambeck . | |
| 4,995,567 | 2/1991 | Ballet . | |

Primary Examiner—John M. Jillions
Attorney, Agent, or Firm—Tarolli, Sundheim & Covell

[57] ABSTRACT

The invention relates to a belt retractor for vehicular seat belt restraining systems having a spiral retraction spring (16) including a radially inner spring connection on the shaft (12) of the belt reel and a radially outer spring connection on a connecting part (18) firmly connected to the frame. A cylindrical part (141) of a cassette (14) surrounds the retraction spring (16). According to the invention the shaft (12) with the inner spring connection is eccentrically disposed with respect to the cylindrical part (141) of the cassette (14) in such a manner that, when the belt webbing is fully coiled, the outer circumference of the retraction spring (16) is disposed substantially concentrically in the cylindrical part (141) of the cassette (14).

6 Claims, 2 Drawing Sheets

SEAT BELT RETRACTOR

The invention relates to a belt retractor for vehicular seat belt restraining systems having a spiral retraction spring including a radially inner spring connection on the shaft of the belt reel and a radially outer spring connection on a connecting part firmly connected to the frame, and a cassette surrounding the retraction spring with a cylindrical part.

Belt retractors of this kind having a retraction spring are known in various embodiments. The retraction spring is arranged in a cassette into which one end of a shaft connected to the belt reel protrudes. The end of the shaft has a slot for the connecting end of a shaft, forming thereby a radially inner spring connection for the retraction spring which as regards a cylindrical part of the cassette is arranged coaxially. A radially outer spring connection for the retraction spring is formed by a peg firmly disposed in the cassette, this peg clasping the outer end of the retraction spring. The retraction spring imparts a spring force to the belt reel and thus to the belt webbing in the coiling-up direction of the belt webbing.

When the belt webbing is uncoiled practically completely from the reel the retraction spring is tensioned almost completely and forms sectionally a substantially circular ring-shaped winding about the inner spring connection. When the belt webbing is retracted the spring relaxes increasingly and is supported in some regions by the inside of the shell of the cassette. The space required by the spring when the belt webbing is substantially fully coiled-up is then smaller than the space defined by the cassette since the retraction spring is never totally relaxed. In the known belt retractors having a coaxial arrangement of the inner spring connection with respect to the cylindrical part of the cassette a sickle-shaped empty space results in the cassette which is not made use of by the retraction spring.

The invention is based on the object of diminishing the space necessary for accommodating the retraction spring in a belt retractor of the aforementioned kind.

This object is achieved for a belt retractor of the aforementioned kind by the shaft with the inner spring connection being eccentrically disposed with respect to the cylindrical part of the cassette in such a manner that, when the belt webbing is fully coiled-up, the outer circumference of the retraction spring is disposed substantially concentrically in the cylindrical part of the cassette. Due to the eccentric arrangement of the inner spring connection and the concentric arrangement of the outer circumference of the retraction spring when the belt webbing is coiled-up in the cassette the latter can be adapted to the outer circumference of the retraction spring and thus reduced in size. Accordingly either a more compact belt retractor is achieved or other functional parts can be accommodated in the vacant space created. For example it can be considered to provide the functional parts of a tensioner drive on the side at which the retraction spring engages the shaft of the belt reel. Reducing the size of the cassette also has the advantage that the material costs therefor are diminished.

In accordance with one advantageous embodiment of the invention the shaft together with the inner spring connection is offset from the center point of the cassette in a direction which—when the belt webbing is coiled-up—is substantially perpendicular to the tangent on the outer winding of the retraction spring at the point of run-out towards the connection part firmly connected to the frame. In this arrangement it is useful to dimension the inner diameter of the casette to not more than approx. 50 mm for a coilable belt length of 2100 mm and to offset the shaft with the spring connection approx. 5 to 10 mm. By means of this configuration an optimum shape of the cassette is attained which makes optimum use of available space.

In a further embodiment the radius of the tensioned retraction spring is essentially the same as the shortest distance of the shaft from the shell of the cassette. Preferably the distance between the mounting baseline of the retraction frame and the cassette should be approx. 20 mm.

To achieve a long useful life of the retraction spring—when the belt webbing is at least substantially fully coiled-up—the outer winding of the retraction spring is not supported at the inside of the cassette, this preventing the outer winding of the spring rubbing against the wall of the cassette and the windings of the spring against each other.

Further features and advantages of the invention will now be evident from the description of the preferred embodiment of the invention with reference to the drawing in which:

FIG. 1 side view of a belt retractor showing a section through a cassette with a retraction spring according to one embodiment of the invention;

Figure 1:
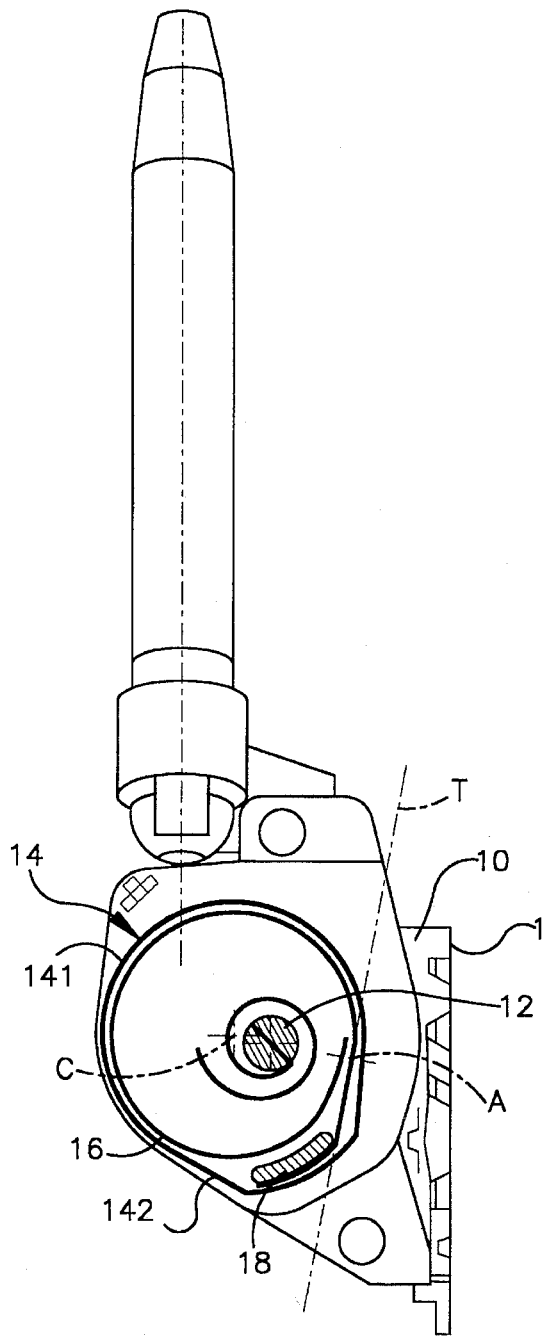

In the embodiment shown the belt retractor together with the pyrotechnical piston/cylinder drive for the tensioning function form a single unit.

In a retractor frame 10 of the belt retractor a belt reel is rotatably mounted. This belt reel includes a shaft 12 which protrudes into a cassette 14 disposed on one side of the retractor frame 10. On the outer circumference of the shaft 12 protruding into the cassette 14 and in accordance with the coiled-up condition of the belt webbing the inner part of a spiral retraction spring 16 is located, the windings of which surround the shaft 12. This shaft 12 is provided with a thru-slot receiving the one end of the retraction spring 16, this thru-slot thus forming a radial inner spring connection for the retraction spring 16. The other end of the retraction spring 16 is connected to a peg 18 firmly connected to the cassette 14, by said end clasping said peg. Accordingly the peg 18 forms a radial outer spring connection for the retraction spring 16.

The cassette 14 comprises a cylindrical part 141 and a tapered section 142 in which the peg 18 is disposed. With respect to the cylindrical part 141 of the cassette 14 the shaft 12 together with the inner spring connection is eccentrically arranged in such a way that when the belt webbing is fully coiled the outer circumference of the retraction spring 16 is located substantially concentrically in the cylindrical part 141 of the cassette 14.

Due to its eccentric arrangement with respect to the center point C of the cassette 14 the shaft 12 together with the inner spring connection is offset in a direction which—when the belt webbing is fully coiled-up—is essentially disposed perpendicular to the tangent T to the outer winding of the retraction spring 16 at the point of runout A towards the peg 18 firmly connected to the frame (FIG. 1).

In addition the cassette 14 is adapted to the retraction spring 16 so that the outer winding of the retraction spring 16 is not supported by the inside of the cassette 14 when the webbing is at least substantially fully coiled-up. In accordance with this embodiment of the invention the inner diameter of the cylindrical part 141 of the cassette 14 is not more than approx. 50 mm for a coilable belt webbing length of 2100 mm, the offset thereby being approx. 5 to 10

By known means the cassette 14 is secured to the retractor frame 10 of the belt retractor. Between the retractor frame 10 and the shaft 12 of the belt reel the retraction spring 16 is thus effective, it imparting a spring force to the belt reel in the retraction direction of the belt webbing. When belt webbing is extended the retraction spring 16 is increasingly wound about the shaft 12 and thus the retraction spring 16 more strongly tensioned.

Figure 2:
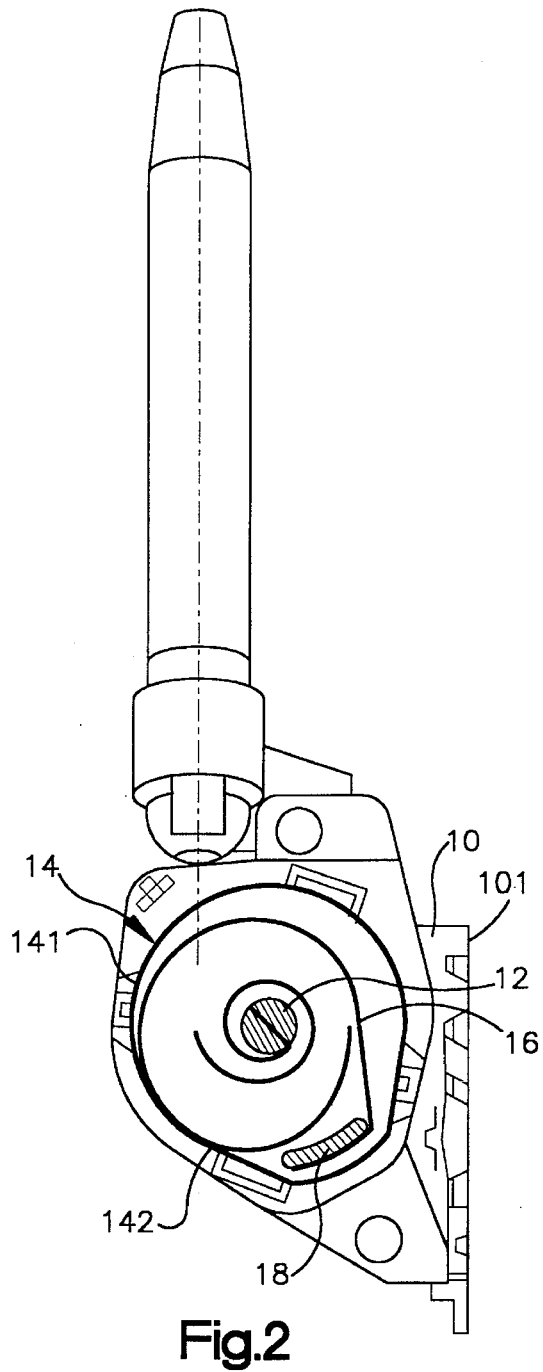
FIG. 2 is a side view of a belt retractor showing a section through a cassette with a retraction spring according to prior art.

In FIG. 2 a belt retractor is illustrated according to prior art in which the cylindrical part of the cassette 141 is disposed in relation to the shaft 12 on the retractor frame that the shaft 12 is arranged coaxially with the cylindrical part 141 of the cassette 14. The inner diameter of the cylindrical part 141 for the belt retractor according to prior art amounts to 54 mm.

As compared to the embodiment according to prior art as shown in FIG. 2 the embodiment according to the invention as shown in FIG. 1 thus has a smaller inner diameter of the cylindrical part 141 of the cassette 14.

The base mounting fixture 101 of the retractor frame 10 is secured to the vehicle body by known means. Due to the reduction in size of the cassette 14 according to the invention (FIG. 1) and its arrangement on the outer wall of the frame the distance between the base mounting fixture 101 and the cassette 14 is 20 mm, so that now more room is available for further design features, for example for the arrangement of function parts of the tensioner drive. By contrast in the known belt retractor (FIG. 2) the distance from the base mounting fixture 101 to the cassette is merely 10 mm.

Figure 3A:
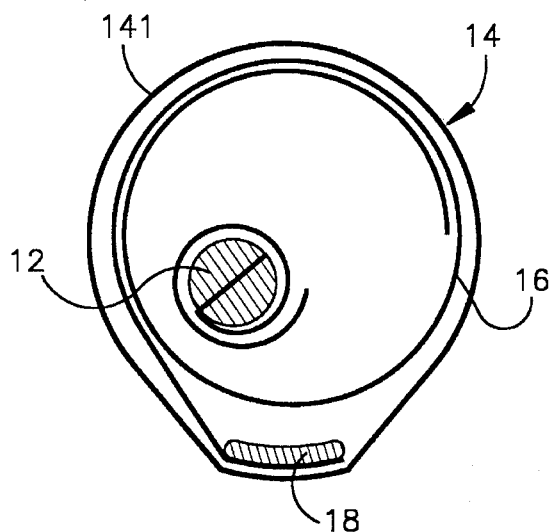
FIGS. 3a and 3b are a schematic section view of the cassette shown in FIG. 1 illustrating two different conditions of retraction.
Figure 4A:
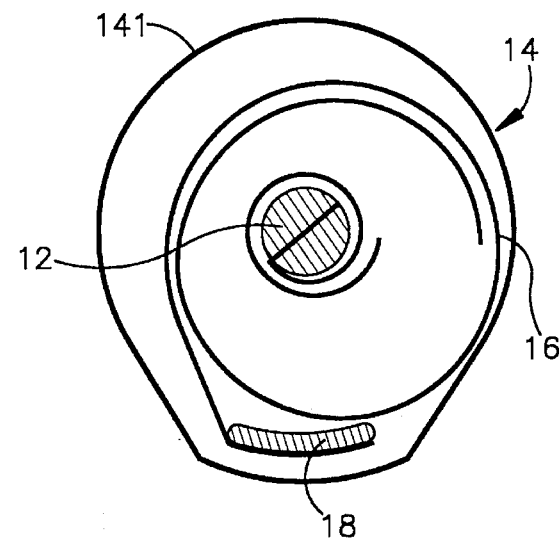
FIGS. 4a and 4b are a schematic section view of the cassette shown in FIG. 2 illustrating two different conditions of retraction.

In the FIGS. 3a and 4a a section view of the cassette 14 according to the invention and according to prior art is shown. The retraction spring 16 is shown here in a condition in which the belt webbing is coiled almost completely on the belt reel and thus the retraction spring 16 is weakly tensioned.

As shown in FIG. 3a the outer circumference of the retraction spring 16 is disposed substantially concentrically in the cylindrical part 141 of the cassette 14 and is arranged a slight distance away from the inner wall of the cylindrical part 141 of the cassette 14. The retraction spring 16 is forced offset from the center of the peg 18 firmly secured to the frame in the cassette 14. The outer winding of the retraction spring 16 of the belt retractor according to the invention assumes an almost circular profile when the belt webbing is coiled-up.

By contrast as shown in FIG. 4a a section of the retraction spring 16 in the known belt retractor is supported—when the belt webbing is coiled up—by the inner wall of the cylindrical part 141 of the cassette 14, it forming a free space in the shape of a sickle when viewed in cross-section which, however, is not needed for retraction and extension of the retraction spring 16 about the shaft 12.

Figure 3B:
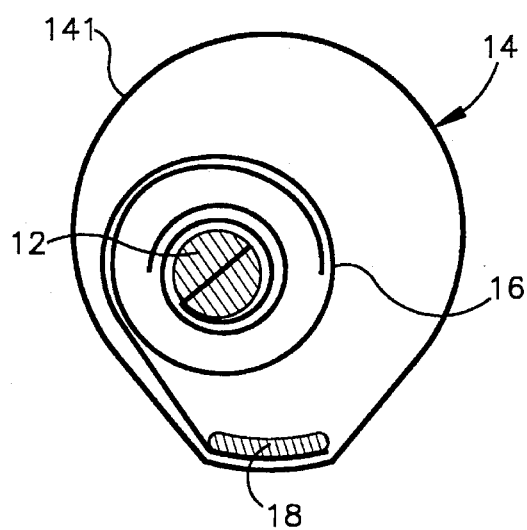
Figure 4B:
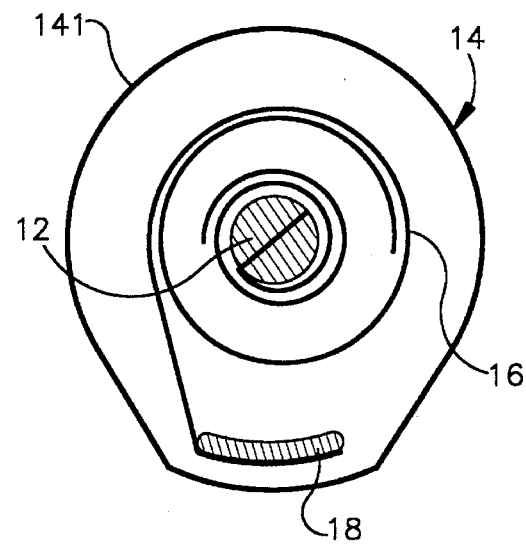

In the FIGS. 3b and 4b the tensioned retraction springs 16 according to the invention and according to prior art are illustrated when the belt webbing is practically totally uncoiled from the belt reel. In this arrangement the windings of the spiral retraction spring 16 are closely located one on the other and form a circular ring about the shaft 12 when viewed in the cross-section. According to the invention the shortest distance between the shell of the cassette 14 and the axis of the shaft 12 corresponds to the radius of the tensioned retraction spring 16 (FIG. 3b). By contrast and according to prior art a near annular vacant space results about the retraction spring 16 in its tensioned condition.

Due to the shaft 12 being disposed eccentrically to the inner spring connection in the cassette 14 it is now possible to reduce the inner diameter of the cassette 14 with respect to the inner diameter of the cylindrical part 141 of the cassette 14 according to prior art. Within the given dimensions of the belt retractor room is now provided for other purposes or other design features.

What is claimed is:

1. A seat belt retractor having a frame, a shaft rotatably mounted in said frame for coiling and uncoiling of belt webbing, a spiral spring having an inner end connected to said shaft and an outer end fixed with respect to said frame, and a cassette laterally fixed to said frame and having a cylindrical portion surrounding said spiral spring, wherein said shaft is eccentrically disposed in said cylindrical cassette portion and said spiral spring, in a relatively relaxed state corresponding to belt webbing being fully coiled up, having an outer periphery disposed concentrically in said cylindrical cassette portion.

2. The seat belt retractor of claim 1 wherein said spiral spring has a substantially tangential outer terminal portion and said shaft has an axis offset from an axis of said cylindrical cassette portion in a direction which is substantially perpendicular to said outer terminal spring portion.

3. The seat belt retractor of claim 2 wherein said shaft and cassette axes are offset a distance between 5 and 10 mm.

4. The seat belt retractor of claim 1 wherein said cylindrical cassette portion has an inner diameter of not more than 50 mm for a coilable belt length of at least 2000

5. The seat belt retractor of claim 2 wherein said spiral spring in a substantially fully tensioned state has a radius corresponding to the shortest distance from said shaft axis to said cylindrical cassette portion.

6. The seat belt retractor of claim 1 wherein said spiral spring in said relatively relaxed state remains radially spaced from the inner periphery of said cylindrical cassette portion.

* * * * *